(12) United States Patent
Genden et al.

(10) Patent No.: US 10,747,545 B2
(45) Date of Patent: Aug. 18, 2020

(54) DUAL COMPARE OF LEAST-SIGNIFICANT-BIT FOR DEPENDENCY WAKE UP FROM A FUSED INSTRUCTION TAG IN A MICROPROCESSOR

(71) Applicant: International Business Machines Corporation, Armonk, NY (US)

(72) Inventors: Michael J. Genden, Austin, TX (US); Hung Q. Le, Austin, TX (US); Dung Q. Nguyen, Austin, TX (US); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 16/202,489

(22) Filed: Nov. 28, 2018

(65) Prior Publication Data

US 2020/0167166 A1    May 28, 2020

(51) Int. Cl.
    *G06F 9/38*     (2018.01)
    *G06F 9/30*     (2018.01)
(52) U.S. Cl.
    CPC ........ *G06F 9/3853* (2013.01); *G06F 9/30021* (2013.01)
(58) Field of Classification Search
    None
    See application file for complete search history.

(56) References Cited

U.S. PATENT DOCUMENTS

| 5,553,255 | A | 9/1996 | Jain et al. | |
| 6,609,189 | B1 | 8/2003 | Kuxzmaul et al. | |
| 2017/0315815 | A1* | 11/2017 | Smith | G06F 9/3017 |
| 2018/0024835 | A1* | 1/2018 | Gschwind | G06F 9/3017 |
| | | | | 712/245 |
| 2019/0042238 | A1* | 2/2019 | Genden | G06F 9/3836 |

OTHER PUBLICATIONS

Tran et al., "Dynamically Reducing Pressure on the Physical Register File through Simple Register Sharing," 2004 International Symposium on Performance Analysis of Systems and Software, IEEE, 2004, 10 pages.

* cited by examiner

*Primary Examiner* — John M Lindlof
(74) *Attorney, Agent, or Firm* — Cantor Colburn LLP; Bryan Bortnick

(57) ABSTRACT

A computing system includes an issue queue and a microprocessor. The issue queue receives a fused instruction, which includes a first instruction portion fused with a second instruction portion different from the first instruction portion. The microprocessor assigns a first instruction tag (ITAG) to the first instruction portion and a second ITAG to the second instruction portion. The microprocessor determines a first bit that represents the first ITAG, inverts the first bit to determine a second bit that represents the second ITAT, and determines an availability of one or more sources of a second instruction different from the fused instruction based at least in part on the first bit or the second bit.

20 Claims, 4 Drawing Sheets

DUAL COMPARE OF LEAST-SIGNIFICANT-BIT FOR DEPENDENCY WAKE UP FROM A FUSED INSTRUCTION TAG IN A MICROPROCESSOR

BACKGROUND

The field of the invention is data processing, or, more specifically, methods, apparatus, and products for processing fused or fused instructions.

Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. The speed of operation and power consumption are just two areas of computer processor technology that affect the efficiency of computer processors.

SUMMARY

According to a non-limiting embodiment, a method is provided to process a fused instruction in a computing system. The method comprises dispatching a fused instruction to an issue queue of the computing system. The fused instruction includes a first instruction portion fused with a second instruction portion different from the first instruction portion. The method further comprises assigning a first instruction tag (ITAG) to the first instruction portion and assigning a second ITAG to the second instruction portion, determining a first bit that represents the first ITAG, inverting the first bit to determine a second bit that represents the second ITAG, and determining an availability of at least one source of a second instruction different from the fused instruction based at least in part on the first bit or the second bit.

According to another non-limiting embodiment, a computing system includes an issue queue and a microprocessor. The issue queue receives a fused instruction, which includes a first instruction portion fused with a second instruction portion different from the first instruction portion. The first instruction portion and the second instruction portion are each associated with one or more sources. The microprocessor assigns a first instruction tag (ITAG) to the first instruction portion and a second ITAG to the second instruction portion. The microprocessor determines a first bit that represents the first ITAG, inverts the first bit to determine a second bit that represents the second ITAT, and determines an availability of at least one source of a second instruction different from the fused instruction based at least in part on the first bit or the second bit.

According to yet another non-limiting embodiment, a computer program product comprises a computer readable storage medium having program instructions embodied therewith the program instructions executable by a computer processor to cause the computer processor to perform a method of processing a fused instruction in a computing system, the method comprising dispatching a fused instruction to an issue queue of the computing system. The fused instruction includes a first instruction portion fused with a second instruction portion different from the first instruction portion. The method further comprises assigning a first instruction tag (ITAG) to the first instruction portion and assigning a second ITAG to the second instruction portion, determining a first bit that represents the first ITAG, inverting the first bit to determine a second bit that represents the second ITAG, and determining an availability of at least one source of a second instruction different from the fused instruction based at least in part on the first bit or the second bit.

DETAILED DESCRIPTION

Figure 1:
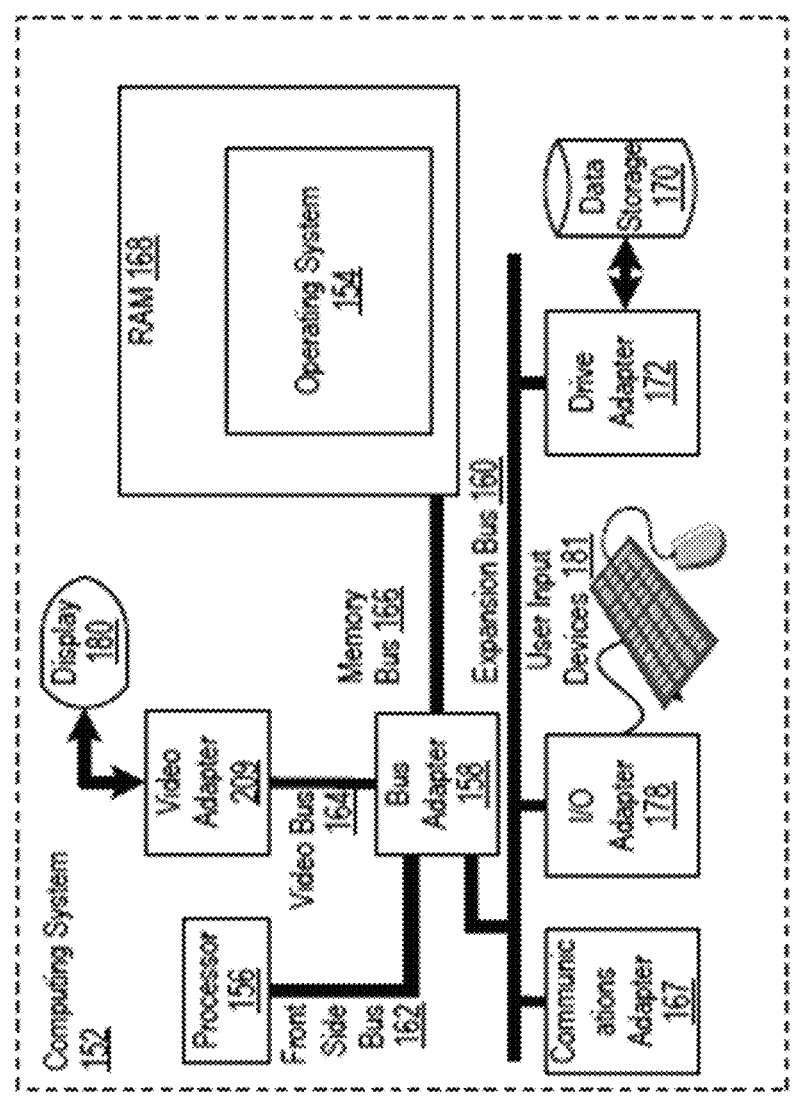
FIG. 1 illustrates a computing system capable of performing a dual compare of least-significant-bit for dependency wake up from a fused instruction tag (ITAG) in a microprocessor according to a non-limiting embodiment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, microprocessors generate instructions to control the process of data in the computing system. Instruction identifiers, sometimes referred to as instruction tags or "ITAGs" are utilized to track and monitor instructions as they are generated and completed. An ITAG includes a set number bits (e.g., 9 bits, (0:8)), which identifies a given instruction and tracks its destination. For example, an ITAG is an identifier for an instruction which is assigned sequentially in dispatch order. An instruction's ITAG is assigned to its "Dest_ITAG" so that the instruction's result can be associated with the instruction for the purposes of dependency matching with the source ITAGs of younger instructions. When a microprocessor issues an instruction, the microprocessor can also send the instruction's corresponding ITAG to the younger instructions that are snooping for its result, which can determine how the younger instructions are executed.

Normally an instruction can broadcast its ITAG by sending one ITAG to the rest of the core to wake up its dependents (i.e., its younger instructions). However, an instruction can be fused or paired with another instruction when, for example, two independent instructions share the same sources or when a result from one of the instructions directly feeds or drives the execution of the second instruction. In these scenarios, the two instructions are combined into a single fused instruction to reduce instruction processing times. When a fused instruction is issued, the fused instruction needs to broadcast two ITAGs (i.e., an ITAG for each portion of the fused instruction). The younger dependent instructions must therefore snoop and compare these two ITAGs with its operands to obtain data from the write back buses.

As described herein, one or more embodiments provide a computing system capable of significantly reducing the number of source compares that are snooping on a fused instruction by sharing all the bits in the ITAG (e.g., 0-7), except for the Least-Significant-Bit (e.g., bit 8). By reducing the number of source compares, resource consumption can be reduced, while overall processing speeds are increased thereby improving the overall operation of microprocessor and computing system.

In at least one embodiment, the computing system assigns a first instruction tag (ITAG) to a first instruction portion of a fused instruction and assigns a second ITAG to a second instruction portion of the fused instruction. The computing system then determines a first bit that represents the first ITAG, and inverts the first bit to determine a second bit that represents the second ITAG. In this manner, the computing system can determine an availability of at least one source of a second instruction different from the fused instruction based at least in part on the first bit or the second bit. Accordingly, the computing system can determine the availability of a source of another instruction (fused or un-fused), which is dependent on the fused instruction.

Referring now to FIG. 1, computing system 152 capable of performing a dual compare of least-significant-bit for dependency wake up from a fused instruction tag in a microprocessor is illustrated according to a non-limiting embodiment. The computing system 152 includes at least one computer processor 156 or "CPU" as well as random access memory (RAM) 168 which is connected through a high speed memory bus 166 and bus adapter 158 to processor 156 and to other components of the computing system 152.

Stored in RAM 168 is an operating system 154. Operating systems useful in computers configured to perform a dual compare of a least-significant-bit (LSB) for dependency wake up from a fused instruction tag in a microprocessor according to embodiments of the present invention include UNIX™, Linux™, Microsoft Windows™ AIX™ IBM's i OS™, and others as will occur to those of skill in the art. The operating system 154 in the example of FIG. 1 is shown in RAM 168, but many components of such software typically are stored in non-volatile memory also, such as, for example, on a disk drive 170.

The computing system 152 of FIG. 1 includes disk drive adapter 172 coupled through expansion bus 160 and bus adapter 158 to processor 156 and other components of the computing system 152. Disk drive adapter 172 connects non-volatile data storage to the computing system 152 in the form of data storage 170. Disk drive adapters useful in computers configured for managing an issue queue (ISQ) for fused instructions and fused instructions in a microprocessor according to embodiments of the present invention include Integrated Drive Electronics (IDE) adapters, Small Computer System Interface (SCSI) adapters, and others as will occur to those of skill in the art. Non-volatile computer memory also may be implemented for as an optical disk drive, electrically erasable programmable read-only memory (so-called EEPROM or Flash memory), RAM drives, and so on, as will occur to those of skill in the art.

The example computing system 152 of FIG. 1 includes one or more input/output (I/O) adapters 178. I/O adapters implement user-oriented input/output through, for example, software drivers and computer hardware for controlling output to display devices such as computer display screens, as well as user input from user input devices 181 such as keyboards and mice. The example computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary computing system 152 of FIG. 1 includes a communications adapter 167 for data communications with other computers and for data communications with a data communications network. Such data communications may be carried out serially through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing an issue queue for fused instructions and fused instructions in a microprocessor according to embodiments of the present invention include modems for wired dial-up communications, Ethernet (IEEE 802.3) adapters for wired data communications, and 802.11 adapters for wireless data communications.

Figure 2:
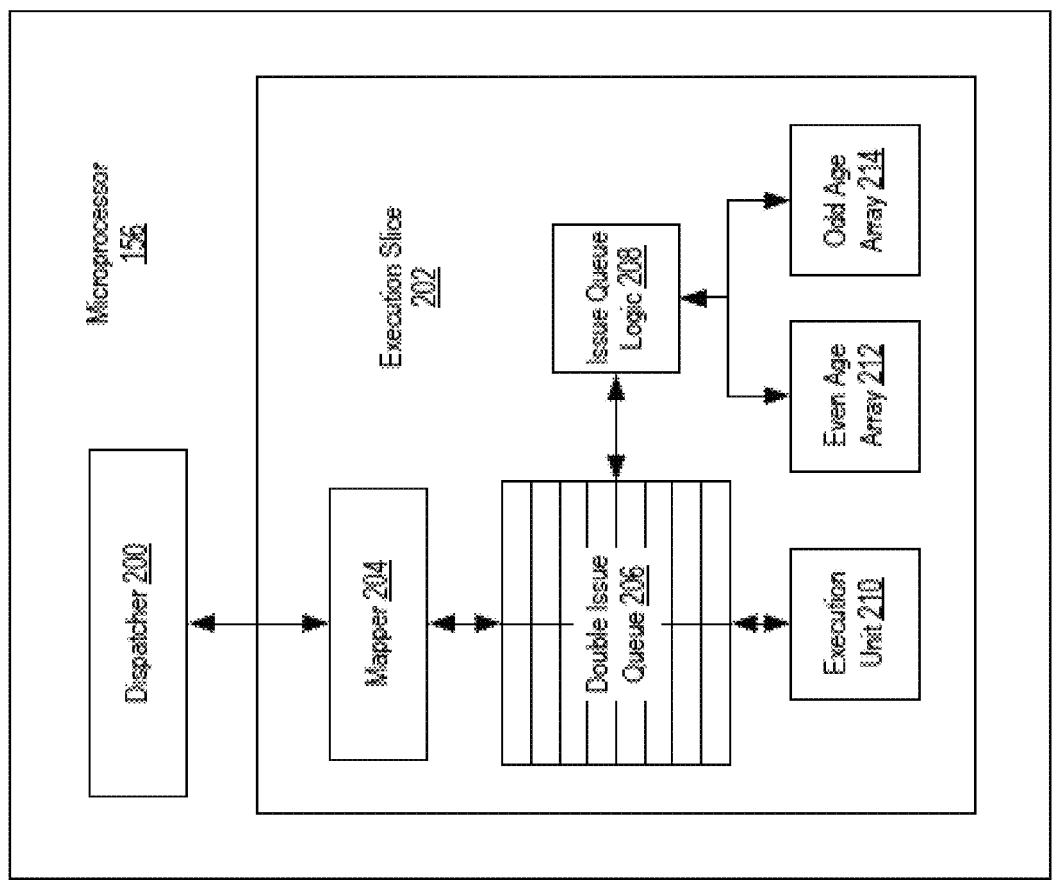
FIG. 2 is a block diagram of an example system configured to perform a dual compare of least-significant-bit for dependency wake up from a fused (ITAG) in a microprocessor according to a non-limiting embodiment.

FIG. 2 shows an exemplary microprocessor for managing an issue queue for fused instructions and fused instructions according to embodiments of the present invention. As shown in FIG. 2, the exemplary microprocessor 156 includes a dispatcher 200 and an execution slice 202. The execution slice 202 includes a mapper 204 a double issue queue (ISQ) 206, issue queue controller 208, an execution unit 210, an even age array 212, and an odd age array 214.

The microprocessor 156 is a computer processor capable of executing computer instructions. The microprocessor 156 may be a multi-slice processor that includes multiple execution slices, such as execution slice 202. The execution slice 202 is a collection of components and circuits configured to support the execution of instructions, including elements not shown in FIG. 2, such as general purpose registers, a history buffer, an arithmetic logic unit (including a vector scalar unit, a floating point unit, and others), etc.

The term 'multi-slice' as used in this specification refers to a processor having a plurality of similar or identical sets of components, where each set may operate independently of all the other sets or in concert with the one or more of the other sets. Each execution slice may be associated with a single load/store slice to form a single processor slice, and multiple processor slices may be configured to operate together.

The dispatcher 200 receives computer instructions from an instruction cache or other source, and dispatches the computer instructions among execution slices, such as execution slice 202. The computer instructions from the instruction cache may correspond to software written by a user and compiled for the microprocessor 156.

The dispatcher 200 may refer to a dispatch network that includes multiple elements. One such element may perform instruction fusing using the received computer instructions. A fused instruction is an instruction that has been generated from multiple computer instructions. A fused instruction may be a combination of two instructions in which one instruction is dependent upon the other instruction. Fused instructions may be two instructions placed together to be executed together (e.g., in parallel, during the same cycle). One fused instruction may occupy two (or more) entries in an issue queue, or one full entry in a double issue queue (e.g. double issue queue 206).

The dispatcher 200 may also pair instructions together for execution as fused instructions. Fused instructions (sometimes referred to as "fused instructions) are two or more instructions that may be placed in the same entry in the double issue queue 206. Fused instructions may also be executed in parallel (e.g., together during the same cycle). Instructions may be paired if executing both instructions would consume less than a maximum available number of execution unit resources. For example, two instructions may be paired if the total operands between the two instructions is less than (or equal to) the number of available read ports. Fused instruction may, if necessary, be dispatched and issued separately.

The mapper 204 tracks the instructions as the instructions move through the execution slice. The mapper 204 may read the source and destination of each instruction, and determine the location of the source and destination in a data register file.

The double issue queue 206 is an issue queue with entries capable of storing at least two instructions, or at least one fused instruction, per entry. The double issue queue 206 may be two or more queues with corresponding sub-entries, with each sub-entry in each queue having corresponding sub-entries in each other queue, and with each group of corresponding sub-entries making up one entry in the double issue queue. Each entry in the double issue queue 206 is capable of storing a fused instruction, two fused instructions, or two individual instructions. Individual instructions are non-fused, non-fused instructions placed independently into the double issue queue 206. As used herein, the term "half" refers to a portion or sub-entry of an entry in the double issue queue 206, and does not limit the number of portions or sub-entries in each entry.

The issue queue logic 208 is circuitry configured to manage the double issue queue 206. The issue queue logic 208 tracks each entry in the double issue queue 206 and determines the next instruction or instructions to issue to the execution unit 210. The issue queue logic 208 also tracks the age and dependencies of each instruction in the double issue queue 206 using age arrays (even age array 212, odd age array 214). The issue queue logic 208 may select the next instruction or instructions to issue based on the content of the age arrays (even age array 212, odd age array 214).

The age arrays (even age array 212, odd age array 214) are data structures used by the issue queue logic 208 to track the age and dependencies of each instruction in the double issue queue 206. The age arrays (even age array 212, odd age array 214 include a slot for each instruction, or portion of an instruction, in the double issue queue 206. For example, a fused instruction constructed from two instructions may have two corresponding slots in the age arrays (one slot in the even age array 212 and one slot in the odd age array 214) each with the same age. As another example, two fused instructions may each have a corresponding slot in the age arrays (a slot for the first fused instruction in the even age array 212 and a slot for the second fused instruction in the odd age array 214) each with the same age (assuming the fused instructions were placed in the double issue queue at the same time). Finally, as yet another example, an individual instruction may have one slot in one of the age arrays depending upon the location of the entry in the double issue queue 206 (e.g., either the even age array 212 or odd age array 214). The age indicator for the individual instruction will be different from the age indicator in the corresponding slot in the other age array (assuming that the individual instruction was not placed in the double issue queue at the same time as the instruction placed in the other half of the double issue queue entry).

The issue queue logic 208 may maintain a different age array for each conceptual "column" of the double issue queue 206. For example, a double issue queue 206 with entries capable of storing two individual instructions, two fused instructions, or a single fused instruction constructed from two instructions may include two conceptual columns with each conceptual row representing a single entry in the double issue queue. In this example, the issue queue logic 208 may maintain two age arrays, such as an even age array 212 and an odd age array 214, where the even age array 212 tracks the age and dependencies for the first half of each entry in the double issue queue 206, and the odd age array 214 tracks the age and dependencies for the second half of each entry in the double issue queue 206.

Each slot in the age arrays may store the age (or age indicator) of the corresponding instruction. The age of the instruction may be the elapsed time since the instruction was placed in the double issue queue. Each slot in the age array may also store an indication of the readiness of each data upon which the instruction depends. Specifically, a slot in the age array for an instruction may indicate whether that instruction is dependent upon the results of other instructions and whether those results are ready to be read by the instruction.

The execution unit 210 is a collection of circuits configured to execute instructions from the double issue queue 206. The execution unit 210 may also store the results from calculations and operations in registers or other memory locations.

Figure 3:
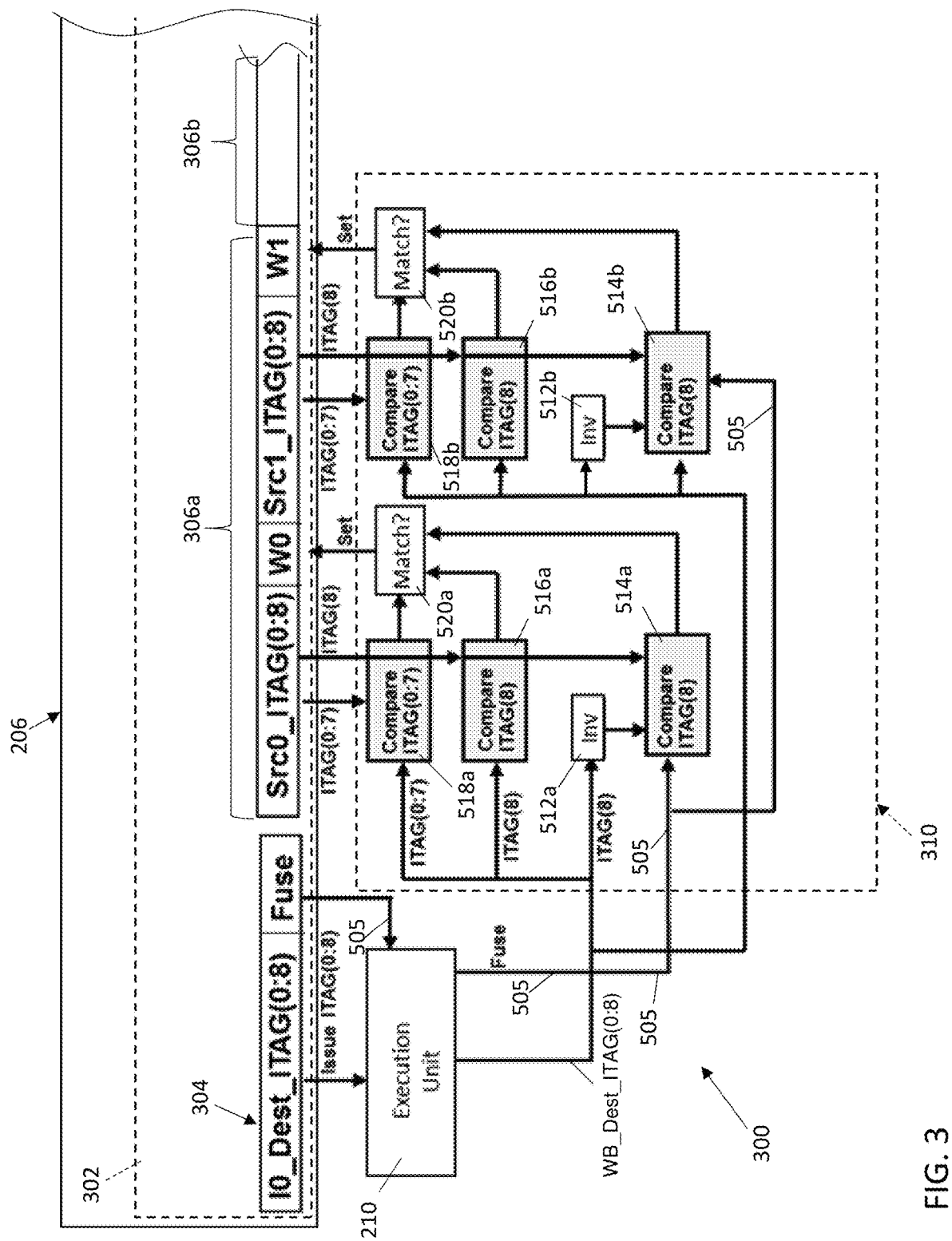
FIG. 3 is a block diagram of an instruction ITAG comparison system according to a non-limiting embodiment.

Turning now to FIG. 3, an instruction ITAG comparison system 300 is illustrated according to a non-limiting embodiment. The instruction ITAG comparison system 300 is in signal communication with an issue queue (ISQ) 206. The issue queue 206 includes one or more ISQ rows, also referred to as issue queue entry 302 containing a destination ITAG 304 and source ITAGS 306a and 306b corresponding to first and second instructions. The issue queue entry 302 is formed of the two individual instructions' source ITAGs 306a and 306b, each which can share the destination ITAG 304. In at least one embodiment, the two instructions whose source ITAGs are 306a and 306b of a given issue queue entry 302 includes an older instruction and a younger instruction (i.e., an instruction dispatched after the older instruction). For a given fused instruction, an even ITAG is assigned to the older instruction, and an odd ITAG (i.e., an even ITAG+1) is assigned to the younger instruction. In the example illustrated in FIG. 3, ITAG 306a can be referred to as the even ITAG 306a (e.g., the older ITAG 306a) while 306b can be referred to as the odd ITAG 306b (e.g., the younger ITAG 306b). Each instruction has multiple sources (i.e., src0, src1) associated with it. Likewise, each instruction has its own destination ITAG. A double issue queue entry, for example, would physically have a second destination ITAG, "I1_Dest_ITAG" (not shown), which is used when the double issue queue entry is occupied by non-fused instructions.

In at least one example illustrated in FIG. 3, an instruction (e.g., instruction 306a) can have two different sources. Therefore, instruction 306a is assigned a first source ITAG (Src0_ITAG) and a second source ITAG (Src1_ITAG). These two source ITAGS (Src0_ITAG and Src1_ITAG) are mapped to a register that is being written by an older instruction that is executing or has executed. The even and odd ITAGs are assigned at dispatch time when the two independent instructions 306a and 306b are fused together.

In response to being issued, the fused instruction in issue queue entry 302 will broadcast out WB_Dest_ITAG, which is the ITAG associated with the result of the executed instruction, to the rest of the core to wake up its younger dependent instructions. In at least one embodiment, the fused instruction in issue queue entry 302 is not required to broadcast both even and odd ITAGs. Therefore, only a portion (e.g., 306a) of the issue queue entry 302 is described in detail herein. It should be appreciated, however, that the remaining portion 306b of the fused instruction could be processed in a similar manner.

The issue queue 206 and the mapper (not shown in FIG. 3) each perform a comparison of the ITAG bits. In at least one embodiment, each source ITAG (e.g., Src0_ITAG(0:8) and Src1_ITAG(0:8)) will compare the bits of the issued fused instruction ITAG (e.g., ITAG(0:7)), except the Least-Significant-Bits (LSB) (e.g., ITAG(8)). The issued fused instruction LSB will be compared as normal (e.g., as an even ITAG), and inverted (e.g., as an odd ITAG) with each source ITAG. By inverting the LSB (e.g., bit 8) of the issued fused instruction, the source ITAG can be effectively compared with both the even and odd ITAGs of the issued fused instruction using a single additional compare bit. The use of a single additional compare bit leads to significant reduction of source ITAG compares for snooping of the fused instruction's write back ITAG.

For example, the execution unit 210 receives a destination ITAG 304 and a fuse indicator signal 505. The fuse indicator signal 505 indicates whether the current instruction to be computed by the execution unit 210 is a fused instruction or a normal instruction (i.e., a single instruction without two or more fused or paired instructions). When the fuse indicator signal 505 indicates that the current instruction to be computed is a fused instruction, the execution unit 210 computes the fused instruction and outputs a write back destination ITAG (WB_DEST_ITAG). The write back destination ITAG can be utilized for both the first fused instruction portion 306a (e.g., the even instruction) and the second fused instruction portion 306b (e.g., the odd instruction) as described further below.

The instruction ITAG comparison system 300 includes an LSB comparator network 310 that allows each of the source ITAGS (Src0_ITAG and Src1_ITAG) to be effectively compared with both the even and odd ITAGs of the fused instruction using a single additional compare bit. The LSB comparator network 310 can include a set of comparators corresponding to each source tag (SrcX_ITAG). In this example, a first set of comparators 514a, 516a and 518a corresponds to the first source tag (Src0_ITAG and a second set of comparators 514b, 516b and 518b correspond to the second source tag (Src1_ITAG).

The instruction ITAG comparison system 300 receives the write back destination ITAG (WB_DEST_ITAG) and the fuse indicator signal 505. In at least one embodiment, the LSB comparator network 310 selectively utilizes the WB_DEST_ITAG to generate a single bit representation of the even ITAG and the odd ITAG.

In response to determining that the fuse indicator signal 505 indicates that the current instruction is a fused instruction, the inverters 512a and 512b invert the state (i.e., a 0 bit is inverted to a 1 bit, and vice versa) of the WB_DEST_ITAG's LSB (i.e., bit 8). Accordingly, the non-inverting bit comparators 516a and 516b receive the LSB of the WB_DEST_ITAG's LSB in its original state as output from the execution unit 210, while the inverting bit comparators 514a and 514b receive the inverted LSB from the inverter 512a and 512b. The ITAG comparators 518a and 518b receive the bits of the WB_DEST_ITAG (e.g., 0:7), excluding the LSB (e.g. bit 8).

Once the inverted LSB is generated, each source ITAG (Src0_ITAG and Src1_ITAG) can effectively perform a comparison with the single bits representing the even ITAG and the odd ITAG. For example, the first source ITAG (Src0_ITAG) outputs its LSB (ITAG(8)) to inverting bit comparator 514a and non-inverting bit comparator 516a, while outputting the remaining bits of its ITAG (ITAG(0:7)) to ITAG comparator 518a. The results of the comparators 514a, 516a and 518a are output to matching unit 520. When the bits of the first source ITAG (Src0_ITAG) match the bits of the destination ITAG (i.e., WB_DEST_ITAG), the matching unit writes a "wake" bit to the wake register (W0), thereby informing the issue queue entry 302 that the source corresponding to the first source ITAG (Src0_ITAG) is available.

A match is satisfied if either the non-inverted Compare ITAG or the inverted Compare ITAG matches the Src0_ITAG. In at least one embodiment, when the fuse indicator signal is asserted, then Src0_ITAG(8) will match, and a match on Compare ITAG(0:7) determines whether or not to write the "wake" bit (W0). In at least one embodiment, a dual compare is performed, which allows the inverted and non-inverted Dest_ITAG(8) to be broadcast at different times. Accordingly, in one cycle the match can check the non-inverted ITAG(8), and in the next cycle the match can check the inverted ITAG(8).

The second source ITAG (Src1_ITAG) performs its comparison in a similar manner as described above. Once the issue queue controller 208 is informed that both the source associated with the first source ITAG (Src0_ITAG) and the source associated with the second source ITAG (Src1_ITAG) are available (e.g., W0=1 and W1=1), the issue queue controller 208 can select the issue queue entry 302 for execution.

By generating single bit representations of the even ITAG and the odd ITAG, the LSB comparator network 310 allows both source ITAGS (Src0_ITAG and Src1_ITAG) to be effectively compared with both the even and odd ITAGs using less processing resources, as opposed to conventional systems that perform a full 9-bit compare for both sources. In this manner, the instruction ITAG comparison system 300 requires less hardware area for performing ITAG bit comparisons, thereby reducing the power consumption of the computing system.

Figure 4:
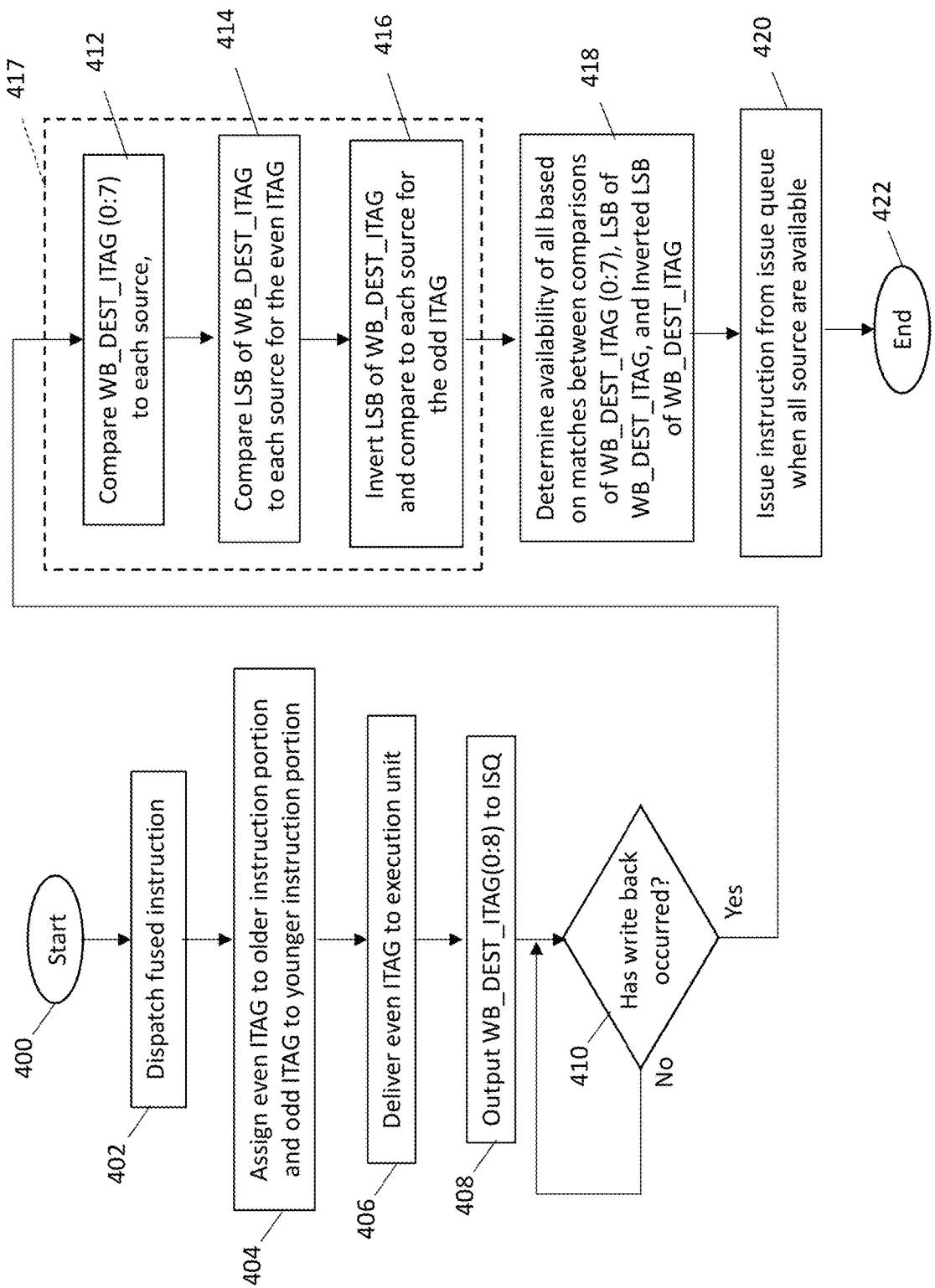
FIG. 4 is a flow diagram illustrating a method of performing a dual compare based on an LSB for dependency wake up from a fused instruction according to a non-limiting embodiment.

Turning now to FIG. 4, a method of performing a dual compare based on a LSB for dependency wake up from a fused instruction is illustrated according to a non-limiting embodiment. The method begins at operation 400 and at operation 402 a fused instruction is dispatched to an issue queue (ISQ). At operation 404, an even ITAG is assigned to a first instruction portion of the fused instruction, while an odd ITAG is assigned to a second instruction portion of the fused instruction. In at least one embodiment, the even ITAG is assigned to an older instruction of the fused instruction, while the odd ITAG is assigned to a younger instruction of the fused instruction. At operation 406, one of the ITAGs of the fused instruction, e.g., the even ITAG, is delivered to the execution unit for computation. At operation 408, the write back destination ITAG (WB_DEST_ITAG) associated with the write back result of the corresponding ITAG (e.g., the even ITAG) is generated and output to the ISQ.

At operation 410, the write back result (i.e., results of the computation) provided by the execution unit is monitored. When the write back has not occurred, the method returns to operation 410 and continues monitoring for the write back. When, however, the write back occurs, the bits (ITAG0:7) of the write back destination ITAG (WB_DEST_ITAG) excluding the LSB (e.g., bit 8) are compared with each source ITAG (e.g., SrcX_ITAG) included with the fused instruction at operation 412. At operation 414, the LSB (ITAG(8)) of the write back destination ITAG (WB_DEST_ITAG) is compared to each source ITAG (e.g., SrcX_ITAG) included with the fused instruction. At operation 416, the LSB (ITAG(8)) of the write back destination ITAG (WB_DEST_ITAG) is inverted and compared to each source ITAG (e.g., SrcX_ITAG) included with the fused instruction. In at least one embodiment, operations 412, 414 and 416 are executed in parallel as indicated by the dashed grouping operation 417.

At operation 418, the availability of each source ITAG (e.g., SrcX_ITAG) is determined based on matches between comparisons of the WB_DEST_ITAG (0:7); excluding the LSB), the LSB of the WB_DEST_ITAG, and the inverted LSB of the WB_DEST_ITAG. At operation 420, an instruction is issued from the issue queue when all the source are determined to be available, and the method ends at operation 422. In at least one embodiment, the instruction issued at operation 420 is dependent on the instruction that was delivered to the execution unit in operation 406. The newly issuing instruction may or may not be fused. In one or more embodiments, the operations of the method described above can be continuously repeated until all the sources are determined to be available so that the instruction can be dispatched from the issue queue.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing a fused instruction in a computing system, the method comprising:
   dispatching a fused instruction to an issue queue of the computing system, the fused instruction including a first instruction portion fused with a second instruction portion different from the first instruction portion;
   assigning a first instruction tag (ITAG) to the first instruction portion and assigning a second ITAG to the second instruction portion;
   determining a first bit that represents the first ITAG, and inverting the first bit to determine a second bit that represents the second ITAG; and
   determining an availability of at least one source of a second instruction different from the fused instruction based at least in part on the first bit or the second bit.

2. The method of claim 1, wherein determining the first bit and second bit comprises:
   providing, via the issue queue, a result associated with a destination ITAG associated with the fused instruction to generate a write back destination ITAG;
   determining a least-significant-bit (LSB) of the write back destination ITAG as the first bit; and
   inverting the LSB of the write back destination ITAG to determine the second bit.

3. The method of claim 2, further comprising determining the availability of the at least one source in response to comparing at least one of the first ITAG and the second ITAG to each of the LSB, the inverted LSB, and bits of the write back destination ITAG excluding the LSB.

4. The method of claim 3, further comprising:
   assigning a source ITAG to another instruction that is dependent on the fused instruction, the source ITAG indicating which instruction produces a result to be used by the dependent instruction; and
   determining the at least one source is available in response to determining the LSB or the inverted LSB match the source ITAG.

5. The method of claim 3, wherein comparing the first ITAG further comprises:
   determining bits of the first ITAG, the bits of the first ITAG including a first ITAG LSB;
   comparing the bits of the first ITAG excluding the first ITAG LSB to the bits of the write back destination ITAG excluding the LSB;
   comparing the first ITAG LSB to the LSB of the write back destination ITAG; and comparing the first ITAG LSB to the inverted LSB of the write back destination ITAG.

6. The method of claim 3, wherein the at least one source includes a plurality of sources, and the availability of each source among the plurality of sources is determined based at least in part on the LSB and the inverted LSB.

7. A computing system comprising:
an issue queue that receives a fused instruction, the fused instruction including a first instruction portion fused with a second instruction portion different from the first instruction portion; and
a microprocessor configured to:
assign a first instruction tag (ITAG) to the first instruction portion and a second ITAG to the second instruction portion;
determine a first bit that represents the first ITAG;
invert the first bit to determine a second bit that represents the second ITAG; and
determine an availability of at least one source of a second instruction different from the fused instruction based at least in part on the first bit or the second bit.

8. The computing system of claim 7, wherein the issue queue provides a result associated with a destination ITAG associated with the fused instruction to generate a write back destination ITAG.

9. The computing system of claim 8, wherein the microprocessor determines a least-significant-bit (LSB) of the write back destination ITAG as the first bit, and inverts the LSB of the write back destination ITAG to determine the second bit.

10. The computing system of claim 9, further comprising a comparator network configured to determine the availability of the at least one source in response to comparing at least one of the first ITAG and the second ITAG to each of the LSB, the inverted LSB, and bits of the write back destination ITAG excluding the LSB.

11. The computing system of claim 10, wherein a source ITAG is assigned to another instruction that is dependent on the fused instruction, the source ITAG indicating which instruction produces a result to be used by the dependent instruction, and wherein the at least one source is determined to be available in response to detecting the LSB or the inverted LSB matches the source ITAG.

12. The computing system of claim 9, wherein the comparator network is further configured to:
determine bits of the first ITAG, the bits of the first ITAG including a first ITAG LSB;
compare the bits of the first ITAG excluding the first ITAG LSB to the bits of the write back destination ITAG excluding the LSB;
compare the first ITAG LSB to the LSB of the write back destination ITAG; and
compare the first ITAG LSB to the inverted LSB of the write back destination ITAG.

13. The computing system of claim 9, wherein the at least one source includes a plurality of sources, and the availability of each source among the plurality of sources is determined based at least in part on the LSB and the inverted LSB.

14. The computing system of claim 7, wherein the first instruction portion is an older instruction with respect to the second instruction portion.

15. A computer program product comprising a computer readable storage medium having program instructions embodied therewith the program instructions executable by a computer processor to cause the computer processor to perform a method of processing a fused instruction in a computing system, the method comprising:
dispatching a fused instruction to an issue queue of the computing system, the fused instruction including a first instruction portion fused with a second instruction portion different from the first instruction portion;
assigning a first instruction tag (ITAG) to the first instruction portion and assigning a second ITAG to the second instruction portion;
determining a first bit that represents the first ITAG, and inverting the first bit to determine a second bit that represents the second ITAG; and
determining an availability of at least one source based of a second instruction different from the fused instruction at least in part on the first bit or the second bit.

16. The computer program product of claim 15, wherein determining the first bit and second bit comprises:
providing, via the issue queue, a result associated with a destination ITAG associated with the fused instruction to generate a write back destination ITAG;
determining a least-significant-bit (LSB) of the write back destination ITAG as the first bit; and
inverting the LSB of the write back destination ITAG to determine the second bit.

17. The computer program product of claim 16, wherein the method further comprises determining the availability of the at least one source in response to comparing at least one of the first ITAG and the second ITAG to each of the LSB, the inverted LSB, and bits of the write back destination ITAG excluding the LSB.

18. The computer program product of claim 17, wherein a source ITAG is assigned to another instruction that is dependent on the fused instruction, the source ITAG indicating which instruction produces a result to be used by the dependent instruction, and wherein the at least one source is determined to be available in response to detecting the LSB or the inverted LSB matches the source ITAG.

19. The computer program product of claim 17, wherein comparing the first ITAG further comprises:
determining bits of the first ITAG, the bits of the first ITAG including a first ITAG LSB;
comparing the bits of the first ITAG excluding the first ITAG LSB to the bits of the write back destination ITAG excluding the LSB;
comparing the first ITAG LSB to the LSB of the write back destination ITAG; and
comparing the first ITAG LSB to the inverted LSB of the write back destination ITAG.

20. The computer program product of claim 17, wherein the at least one source includes a plurality of sources, and the availability of each source among the plurality of sources is determined based at least in part on the LSB and the inverted LSB.

* * * * *